United States Patent [19]
Mercat et al.

[11] Patent Number: 5,105,683
[45] Date of Patent: Apr. 21, 1992

[54] DEVICE FOR RELEASABLY SECURING A SHOE TO A BICYCLE PEDAL

[76] Inventors: Jean-Pierre Mercat, 24, Rue Gambetta, 37110 Chateau-Renault; Jean-Louis Chretien, 18320 Cours les Barres, both of France

[21] Appl. No.: 651,964

[22] Filed: Feb. 7, 1991

[30] Foreign Application Priority Data

Apr. 17, 1990 [EP] European Pat. Off. ...... 90107261.1

[51] Int. Cl.⁵ ............................................. G05G 1/14
[52] U.S. Cl. .................................. 74/594.6; 74/594.4; 36/131
[58] Field of Search .................... 74/594.4, 594.6; 36/131, 132

[56] References Cited
U.S. PATENT DOCUMENTS

| | | | |
|---|---|---|---|
| 4,628,763 | 12/1986 | Konzorr | 74/594.6 |
| 4,686,867 | 8/1987 | Bernard et al. | 74/594.6 |
| 4,882,946 | 11/1989 | Beyl | 36/131 X |
| 4,922,786 | 5/1990 | Romano | 74/594.4 |
| 4,928,549 | 5/1990 | Nagano | 36/131 X |
| 5,014,571 | 5/1991 | Dapezi | 74/594.6 |

FOREIGN PATENT DOCUMENTS

| | | | |
|---|---|---|---|
| 0098329 | 1/1984 | European Pat. Off. | 74/594.6 |
| 0218731 | 4/1987 | European Pat. Off. | 74/594.6 |
| 0296898 | 12/1988 | European Pat. Off. | 74/594.6 |
| 2202499 | 9/1988 | United Kingdom | 36/131 |

*Primary Examiner*—Vinh T. Luong
*Attorney, Agent, or Firm*—Gifford, Groh, Sprinkle, Patmore and Anderson

[57] ABSTRACT

A device for releasably securing a shoe to a bicycle pedal comprises a hook member provided on a hook carrier mounted on the pedal body, the hook carrier being formed as an inherently elastic pivotal hook carrier which can be deflected in a plane perpendicular to the pedal axle.

8 Claims, 1 Drawing Sheet

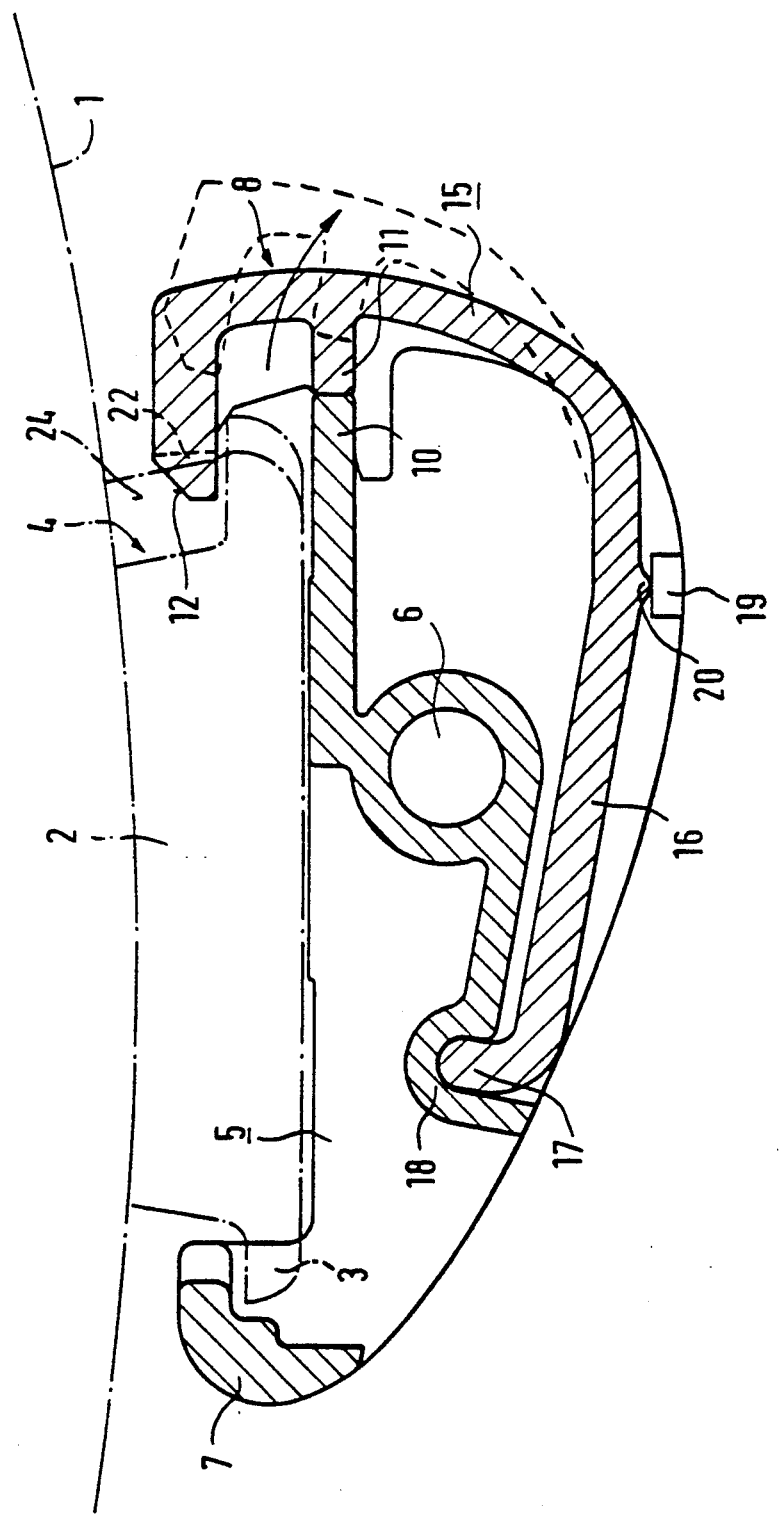

DEVICE FOR RELEASABLY SECURING A SHOE TO A BICYCLE PEDAL

FIELD OF THE INVENTION

The present invention relates to a device for releasably securing a shoe to a bicycle pedal, comprising a plate intended to be fixed to the sole of the shoe and having a front coupling projection and a rear coupling recess, a fixed mounting which is provided in the front region of the pedal body and engages around the coupling projection, and an elastically sprung hook member which is provided in the rear region of the pedal body and engages into the coupling recess of the plate, at least one of the coupling recess and the hook member being provided within inclined surfaces which are effective upon pivoting of the shoe in a horizontal plane for releasing the connection between the plate and the pedal body.

BACKGROUND OF THE INVENTION

Such devices, termed safety pedal arrangements, are known in which the resiliently sprung hook member comprises a claw or hoop which is journalled on a pivot axle and stands under spring bias. Furthermore, devices are known in which, for the purpose of simplification, an attempt is made to avoid the pivot axle support for the claw or hoop. Examples of the last named embodiments are shown in EP A 1 0 296 898 and EP A 1 0 218 731.

These solutions either have the disadvantage that the forces which can be transmitted between the shoe and the pedal without the danger of an intentional separation do not satisfy the practical requirements, or the disadvantage that the total construction is unsatisfactory, in particular with regard to the technical manufacturing effort that is required or with respect to operational reliability over a long period of time.

OBJECT OF THE INVENTION

It is an object of the invention to form a device of the initially named kind in a particularly economical manner, both with regard to the cost of the material and the manufacturing process, and nevertheless to ensure the full operational reliability required in practice.

SUMMARY OF THE INVENTION

According to the invention this object is met in a device of the initially named kind wherein the fixed mounting which engages around the coupling projection is formed in one piece with the pedal body and the hook member is formed at a rear end of an inherently elastic pivotal hook carrier the hook carrier having a front mounting end engaging into a mounting bearing of the pedal body, whereby the mounting bearing defines a pivot bearing for the hook carrier, the pedal body having a support member fixed thereto at a distance rearwardly from the pivot bearing, and the hook carrier having at least one essentially straight portion between the pivot bearing and the support member, which forms a resilient bending zone.

The particular advantages of this pivotal hook which is pivotally mounted at its front end and fixedly supported in an intermediate region lie in the fact that a very high strength can be attained despite a very compact manner of construction, in the fact that the process of climbing into and releasing the device is improved because the position of the pivotal hook can be preset in a very defined manner and because its spring characteristic can be improved, and in the fact that despite the simple construction an overall function can be attained which is equivalent to devices with a substantially more complex design.

SHORT DESCRIPTION OF THE DRAWING

The invention will now be explained in the following in more detail with reference to the sole FIGURE which is a longitudinal sectional representation of the device of the invention.

DETAILED DESCRIPTION OF THE PREFERRED EMBODIMENT

The FIGURE shows the sole contour of a shoe 1 to which a plate 2 is secured for releasable latching with a bicycle pedal.

This plate 2 has a coupling projection 3 at its front end, the projection being spaced from the sole of the shoe, and a coupling recess 4 at its rear end. The coupling recess 4 is shaped in a known manner and is provided at its sides with inclined surfaces 24 which cooperate with corresponding inclined surfaces 22 provided at the sides of the pivotal hook member 8 to be described later. It is practically sufficient to provide an inclined surface 22 at only one side of the hook member 8 and only one cooperating inclined surface 24 on the corresponding side of the coupling recess 4 of the plate 2. However, in the interest of avoiding the provision of different arrangements for the left and right pedals it is preferable to provide inclined surfaces 22 on both sides of the hook member 8 and corresponding inclined surfaces 24 on both sides of the coupling recess 4. Thus, in fact, the FIGURE shows an inclined surface 24 on the left-hand side of the hook member 8 and an inclined surface 22 at the right-hand side of the coupling recess 4 (when the pedal assembly is viewed from the rear towards the front).

The pedal body 5 which is pivotable about a pedal axle 6 is provided at its front end with a fixed mounting 7 which has the form of a recess formed in the body 5 of the pedal and engages around the coupling projection 3 so that in the coupled state the coupling projection is secured against vertical lifting out of this fixed recess and also against being horizontally turned out of this fixed recess.

A hook member 8 formed as a pivotal hook engages into the rear coupling recess 4, with the hook member being provided at the rear end of an inherently elastic hook carrier 15 mounted on the pedal body 5 in a manner which will be later explained.

The hook carrier 15 can be made of any desired suitable material which satisfies the requirements with regard to elasticity and mechanical strength.

The width of the hook member 8 is so selected that the required cooperation with the inclined control surfaces in the side regions of the coupling recess 4 is ensured. This width will typically be about one half of the width of the sole of the shoe but can be greater or smaller if desired. The upper end of the hook member 8 is provided with a customary oblique coupling surface 12 in order to ensure, in cooperation with a similarly inclined surface on the plate 2 easy insertion onto the pedal and latching of the hook member 8.

At its front end, the hook carrier 15 is angled upwardly towards the pedal body 5 to form a mounting end 17 which engages in form-locked manner into a corresponding mounting bearing 18 provided in the pedal body 5.

At a predetermined distance rearwardly from this pivot mounting 17, 18, an essentially straight section 16 of the hook carrier 15 is supported by a support member 19 fixed relative to the pedal body and the straight section 16 has preferably a pivot projection 20 at this point to thereby define a small surface contact area of the hook carrier 15 on the support element 19. The portion of the hook carrier extending from the support member 19 to the hook member 8 at its rear end is curved in the manner of a circular arch such that the hook carrier exhibits inherent elastic pivotal properties and is resiliently deformable through enlargement of its radius of curvature.

Preferably, the pivot bearing 17, 18, is disposed approximately centrally between the pedal axle 6 and the fixed mounting recess 7 and further the support member 19 is located on the other side of the pedal axle 6 and approximately at the same distance therefrom as the pivot bearing 17, 18.

The pedal body 5 is provided, for example at the rear edge thereof, with a fixed abutment 10 and the hook carrier 15 is provided with a projection 11 which engages the abutment 10, preferably under spring bias under the effect of the inherent elasticity of the hook carrier, to thereby define the latched position of the hook carrier. Preferably, the fixed abutment 10 is disposed above the pedal axle 6.

We claim:

1. A device for releasably securing a shoe having a sole to a bicycle pedal, comprising a plate intended to be fixed to said sole of said shoe and having a front coupling projection and a rear coupling recess, a pedal body comprising a central pedal axis, a front region and a rear region, a fixed mounting which is provided in said front region of said pedal body and engages around said front coupling projection, and an elastically sprung hook member which is provided in the rear region of said pedal body and engages into said rear coupling recess of said plate, at least one of the coupling recess and the hook member being provided with inclined surfaces which are effective upon pivoting of the shoe in a horizontal plane for releasing the connection between said plate fixed to said shoe and the pedal body, wherein the fixed mounting which engages around said front coupling projection is formed of one piece construction with the pedal body and the hook member is formed at a rear end of an inherently elastic pivotal hook carrier, the hook carrier having a front mounting and engaging into a mounting bearing of the pedal body, whereby the mounting bearing defines a pivot bearing for the hook carrier, the pedal body having a support member fixed thereto at a distance rearwardly from the pivot bearing, and the hook carrier having at least one essentially straight portion between the pivot bearing and the support member, which forms a resilient bending zone.

2. Device according to claim 1, wherein the inherently elastic pivotal hook carrier is curved at least over a portion of said hook carrier extending between the hook member and the support member in the manner of a circular arch and is resiliently deformable by enlargement of its radius of curvature.

3. Device according to claim 1, wherein the pivot bearing is disposed approximately centrally between the pedal axis and the fixed mounting.

4. Device according to claim 1, wherein the support member is disposed on a side of the pedal axis and approximately at the same distance as the pivot bearing.

5. Device according to claim 1, wherein a fixed abutment is provided on the pedal body and said inherently elastic pivotal hook carrier engages said fixed abutment to thereby define a latched position for said hook carrier.

6. Device according to claim 5, wherein the hook carrier is elastically biased against the fixed abutment.

7. Device according to claim 5, wherein the fixed abutment is disposed above the pedal axis and is defined by a rear edge of the pedal body.

8. Device according to claim 5, wherein the hook carrier is provided with a projection which engages the fixed abutment.

* * * * *